United States Patent [19]
Jania et al.

[11] 3,708,031
[45] Jan. 2, 1973

[54] MAXIMUM VEHICLE SPEED LIMITER

[75] Inventors: Zbigniew J. Jania, Northville; Lawrence J. Vanderberg, Ann Arbor, both of Mich.

[73] Assignee: Ford Motor Company, Dearborn, Mich.

[22] Filed: Dec. 31, 1970

[21] Appl. No.: 103,213

[52] U.S. Cl. ................................. 180/110, 123/102
[51] Int. Cl. ............................................. B60k 31/00
[58] Field of Search......180/110, 109, 107, 106, 105; 123/102

[56] References Cited

UNITED STATES PATENTS

| | | | |
|---|---|---|---|
| 2,822,881 | 2/1958 | Treharne | 180/110 |
| 3,520,380 | 7/1970 | Radin et al. | 180/106 |
| 2,265,524 | 12/1941 | Fruth | 180/110 X |
| 3,070,185 | 12/1962 | Fales | 123/102 X |
| 2,978,059 | 4/1961 | Miller | 123/102 X |
| 3,099,329 | 7/1963 | Von Berg et al. | 180/109 |
| 1,390,510 | 9/1921 | Douglas et al. | 180/105 E |
| 3,525,017 | 8/1970 | Rosenberg et al. | 123/102 X |

Primary Examiner—Benjamin Hersh
Assistant Examiner—John P. Silverstrim
Attorney—John R. Faulkner and Keith L. Zerschling

[57] ABSTRACT

A maximum vehicle speed limiter for use in an automotive vehicle that has a throttle pedal connected to a carburetor throttle valve through a linkage means. This linkage means includes two links which are pivotally connected through a pivotal connection at one end of each of the links. The other end of one of the links is coupled to the throttle pedal, and the other end of the link is pivotally anchored in the automotive vehicle. Means in the form of additional linkage is coupled to the throttle pedal and to a position intermediate the ends of the first mentioned link. When the speed of the automotive vehicle is below a predetermined limit, an electromagnet holds the pivotal connection between the two links in a given position. When this speed is exceeded, the electromagnet is de-energized and the pivotal connection moves into a second position which acts on the linkage connected to the carburetor throttle plate to move this throttle plate towards a closed position, thereby limiting the maximum speed of the automotive vehicle.

10 Claims, 5 Drawing Figures

PATENTED JAN 2 1973 3,708,031
SHEET 1 OF 2
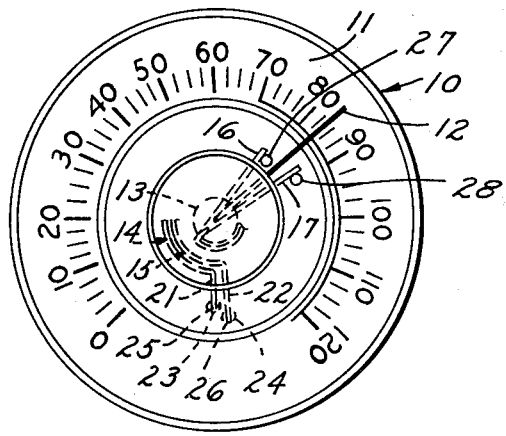
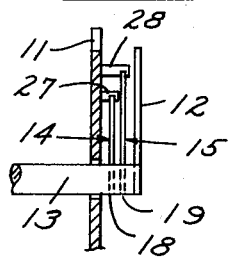
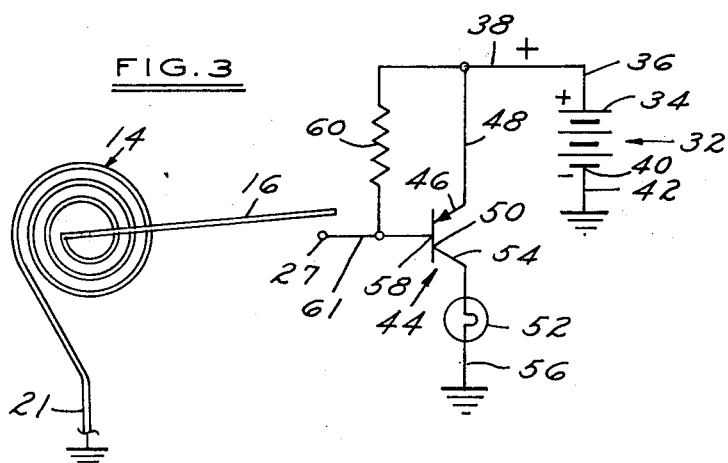
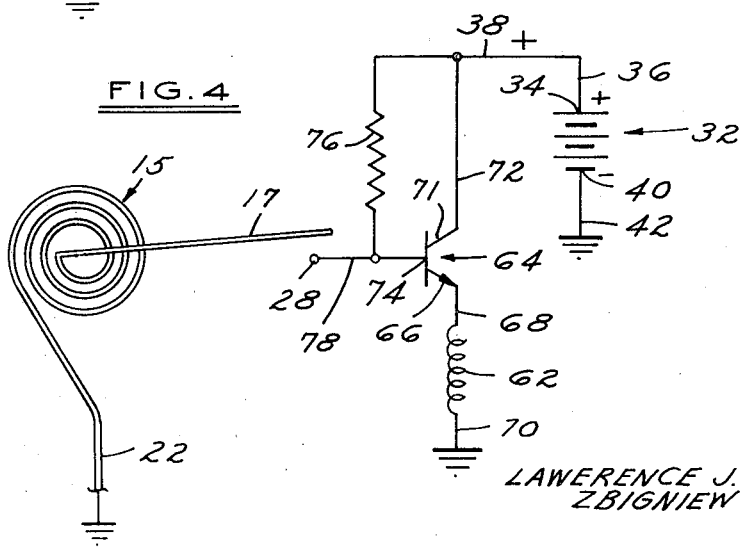
INVENTORS
LAWERENCE J. VANDERBERG
ZBIGNIEW J. JANIA

MAXIMUM VEHICLE SPEED LIMITER

BACKGROUND OF THE INVENTION

This invention relates to a maximum vehicle speed limiter and, more particularly, to such a maximum vehicle speed limiter that acts on the linkage interconnecting an accelerator or throttle pedal with a carburetor throttle valve for moving this throttle valve toward a closed position when a predetermined maximum vehicle speed is exceeded.

There have been many proposals in the prior art to limit the maximum speed obtainable by an automotive vehicle. Most of these systems are designed to come into operation when the vehicle reaches a certain predetermined maximum speed in the range of from 80 to 95 miles per hour. One example of such a maximum vehicle speed limiter is shown in U.S. Pat. No. 3,520,380. In the speed limiter disclosed in this patent means are provided for lengthening the link that interconnects the throttle plate of the vehicle and the accelerator pedal of the vehicle. This means comprises a solenoid and a keeper with the solenoid being normally energized when the speed of the vehicle is below some predetermined limit. When the speed of the vehicle exceeds this predetermined limit, the solenoid is de-energized thereby permitting the keeper to move until it comes into engagement with a stop. This lengthens the linkage and allows the return spring affixed to the vehicle throttle plate to return this throttle plate toward the closed position.

The present invention represents an improvement over the prior art known to the applicants, including the maximum vehicle speed limiter shown in the U.S. Pat. No. 3,520,380 discussed above.

SUMMARY OF THE INVENTION

The present invention provides an uncomplicated and inexpensive means for controlling the maximum speed of a motor vehicle. This means includes a linkage means arranged to interconnect the throttle pedal of the vehicle with the carburetor throttle valve. In the preferred form of the invention, this linkage means includes a first link and a second link which are pivotally connected at the ends of each link by means of a pivotal connection. The other end of one of the links is coupled to the vehicle throttle pedal and the other end of the other link is pivotally anchored in the vehicle. Additional linkage means is coupled to the carburetor throttle and to the first link at a position intermediate the ends thereof. Means are provided that are operatively coupled to the second link for maintaining the pivotal connection between the first link and the second link in one position when the speed of the automotive vehicle is below a predetermined limit and for moving this pivotal connection in a direction to move the carburetor throttle valve toward its closed position when the speed of the vehicle exceeds this predetermined limit.

This last mentioned means, preferably, comprises an electromagnet which is positioned adjacent the second mentioned link. When the speed of the automotive vehicle is below the predetermined speed limit, this electromagnet is energized and it acts on the second mentioned link to hold the pivotal connection between the first link and the second link in a predetermined position. The throttle pedal acts on this first mentioned link and the first mentioned link pivots about this pivotal connection to control the opening and closing of the carburetor throttle valve or plate.

Switch means are provided that change from one state to another, for example, from an open to a closed state, to de-energize the solenoid winding or electromagnet winding when the speed of the vehicle exceeds this predetermined limit. As a result, the electromagnet no longer acts magnetically on the second mentioned link and the pivotal connection between the first and the second link moves to a second position and during this movement carries with it the first link in a direction to move the carburetor throttle plate or valve toward its closed position thereby decreasing the speed of the vehicle and maintaining it under the predetermined maximum speed level mentioned above.

The present invention also includes means for energizing a warning lamp at some speed below the maximum predetermined speed level mentioned above thereby warning the vehicle operator that he is approaching this maximum predetermined speed level.

An object of the present invention is the provision in an automotive vehicle of a means to limit the maximum speed of the vehicle.

Another object of the present invention is the provision of a maximum vehicle speed limiter that is reliable, uncomplicated and inexpensive.

A further object of the invention is the provision of an uncomplicated and inexpensive mechanism for controlling the speed of an automotive vehicle in which the speed of the vehicle is reduced when the vehicle speed reaches a predetermined maximum speed level, and in which the vehicle operator must remove his foot from the accelerator pedal in order to restore control of the speed of the vehicle operator after such reduction in vehicle speed.

Other objects and attendant advantages of the invention will become more apparent as the specification is considered in connection with the attached drawings.

BRIEF DESCRIPTION OF THE DRAWINGS

FIG. 1 is a front elevational view of a conventional speedometer with portions in dotted lines to show the means for controlling circuits that give a warning to a vehicle operator that he is approaching a maximum predetermined speed and for reducing the speed of the vehicle below a predetermined maximum speed when that speed is reached;

FIG. 2 is a partial side elevational view of the speedometer shown in FIG. 1;

FIG. 3 is a circuit diagram showing the circuit for giving a warning when the vehicle is approaching a maximum predetermined speed;

FIG. 4 is a circuit diagram of a circuit that will de-energize the solenoid of the present invention and return the speed of the vehicle to a speed below a maximum predetermined speed level.

Figure 5:
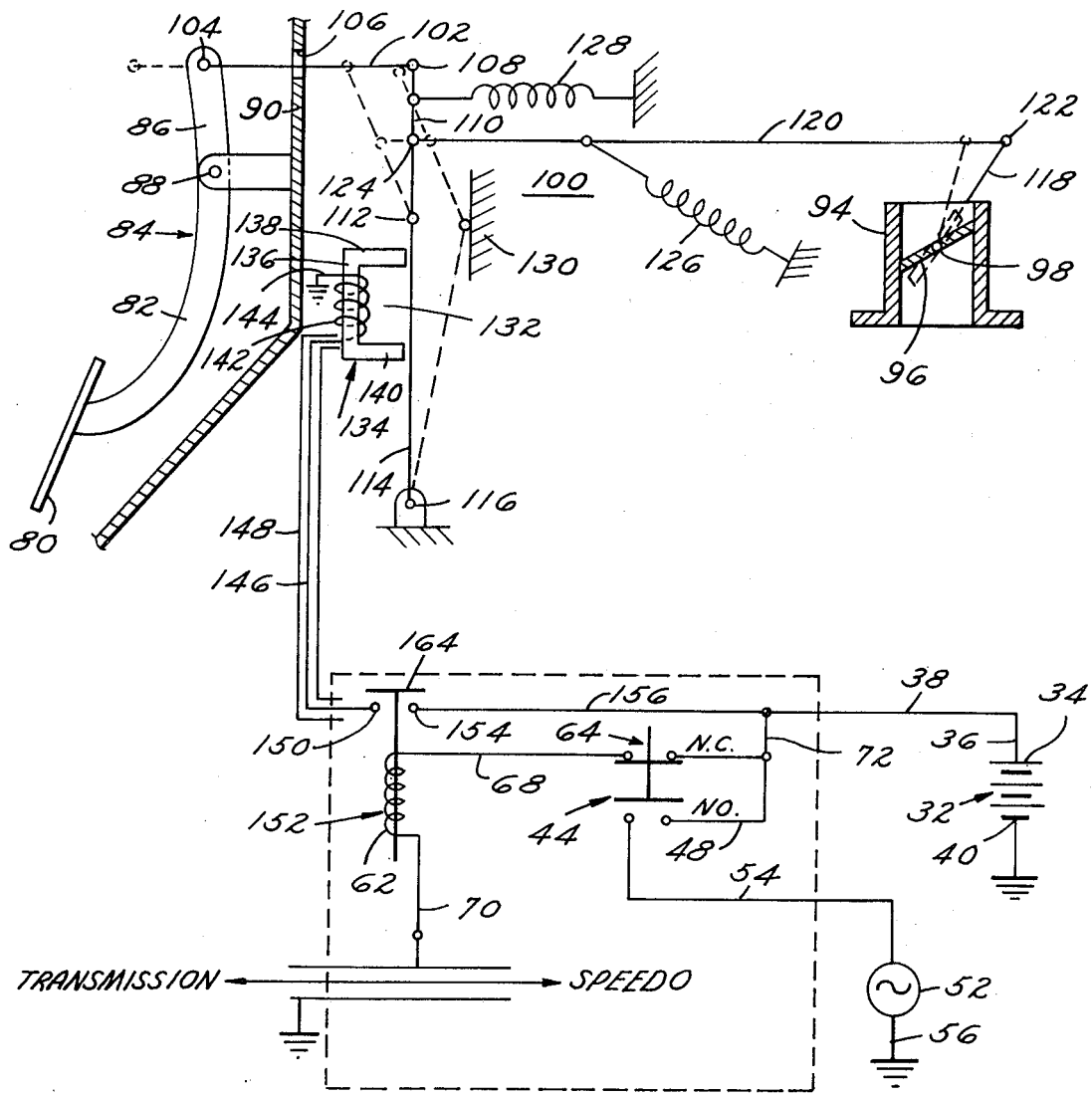
FIG. 5 discloses a throttle linkage between the accelerator or throttle pedal and the carburetor throttle in an automotive vehicle that incorporates the maximum speed control mechanism of the present invention.

Referring now to the drawings in which like reference numerals designate like parts throughout the several views thereof, there is shown in FIGS. 1 and 2 a conventional speedometer 10 having an indicator dial 11 and a pointer 12 driven by a conventional eddy current cup device. The output shaft 13 to which the pointer 12 is attached has a first hairspring 14 and a second hairspring 15 attached thereto. This attachment may be accomplished by passing straight portions 16 and 17, respectively, of each of the hairsprings 14 and 15 through spaced bores 18 and 19 in the speedometer output shaft 13 at an angle substantially perpendicular to the longitudinal axis of the speedometer shaft. The other ends 21 and 22 of the hairsprings 14 and 15, respectively, are anchored with respect to the indicator dial 11 by anchoring them in slots 23 and 24 in pins 25 and 26 that are affixed to the speedometer dial.

The ends 16 and 17 of the hairsprings 14 and 15, respectively, are adapted to engage pins 27 and 28, respectively, that are affixed to the speedometer dial 11 to thereby close electrical circuits that are described in greater detail below. For this purpose, the two pins 27 and 28 are circumferentially and radially spaced on the speedometer dial with respect to each other and with respect to the axis of the speedometer output shaft 13. Moreover, the axial length of the pin 27 is shorter than the axial length of the pin 28 to conform to the axial spacing of the two hairsprings 14 and 15 along the axis of the speedometer shaft 13 and so that the end 17 of spring 15 may pass over the pin 27 and not engage it as the speed of the vehicle increases and the speedometer shaft 13 is rotated in a clockwise direction, as shown in FIG. 1. Moreover, as shown in this figure, the pin 27 is positioned in the speedometer dial 11 so that the end 16 of hairspring 14 will engage it when the speed of the vehicle reaches 80 miles per hour, while the pin 28 is positioned so that end 17 of spring 15 will engage it when the speed of the vehicle reaches 90 miles per hour.

Referring now to FIG. 3, there is shown a circuit diagram of a circuit that will be energized when the speed of the vehicle reaches 80 miles per hour and the end 16 of the hairspring 14 comes into engagement with the pin 27. This circuit comprises a source of electrical energy in the form of storage battery 32 of the motor vehicle in which the mechanism of this invention is mounted. The storage battery 32 has a positive terminal 34 connected through lead 36 to a lead 38 and a negative terminal 40 connected to ground through a lead 42.

A transistor 44 of the NPN type has an emitter electrode 46 connected to lead 38 through a lead 48, a collector electrode 50 connected to one terminal of a warning lamp 52 through a lead 54. The other terminal of the warning lamp 52 is connected to ground through a lead 56. The base electrode 58 of transistor 44 is connected to lead 38 through a resistor 60 for providing proper bias between the emitter electrode 46 and the base electrode 58.

The base electrode 58 is connected through a lead 61 with the pin 27 positioned in the indicator dial 11. FIG. 3 discloses the hairspring 14 that is attached to the speedometer shaft 13 with the end portion 16 thereof located so that it may engage the pin 27. The end 21 of hairspring 14 is shown connected to ground and this is accomplished by providing a ground connection to the pin 25 located in the indicator dial 11.

It may be readily appreciated that in the operation of the circuit shown in FIG. 3, the transistor will be in its nonconducting state when the end 16 of the hairspring 14 is out of contact with the pin 27 since no base current can flow out of the base 58. When the end 16 of the hairspring 14, however, comes into contact with the pin 27, a current path is provided from the base 58 to ground through the pin 27, the end 16, the main body and the end 21 of hairspring 14 and the pin 25. As a result, when the end 16 of hairspring 14 comes into contact with the pin 27, the transistor 44 is switched to its conducting state thereby energizing and illuminating the warning lamp 52. As previously stated, the pin 27 is positioned at the 80 mile per hour mark on the indicator dial 11 so that when this speed is reached, the transistor 44 is switched to its conducting state and the warning lamp 52 is energized. This provides a warning to the vehicle operator that he has reached a predetermined speed level which for illustrative purposes has been set at 80 miles per hour. It is, of course, obvious that the speed warning may be given at any other speed by merely locating the pin 27 in a proper location on the indicator dial 11.

Referring now to FIG. 4, there is shown a circuit for de-energizing a solenoid or winding 62 when the speed of the automotive vehicle reaches some predetermined maximum level, for example, 90 miles per hour, as illustrated in FIG. 1. In this circuit, the source of electrical energy or storage battery of the automotive vehicle is again designated by the numeral 32. The positive terminal 34 of the storage battery 32 is connected through lead 36 to a line 38, and the negative terminal 40 thereof is connected to ground. A solid state switching means in the form of a PNP transistor 64 has its emitter 66 connected to ground through lead 68, solenoid or winding 62 and lead 70, and its collector 71 connected to line 38 through lead 72. The base 74 is connected through resistor 76 to line 38 and through lead 78 to the pin 28 shown in FIG. 1.

The resistor 76 applies a proper bias to the base 74 of transistor 64 to maintain it in a conducting state, thereby maintaining the solenoid or winding 62 in an energized state. When the speed of the automotive vehicle reaches the above mentioned predetermined maximum level, i.e., 90 miles per hour, the straight portion or end 17 of the hairspring 15 engages the pin 28, thereby connecting the base 74 of the transistor 64 to ground through the hairspring 15. This switches the transistor 64 to a nonconducting state and de-energizes the solenoid or winding 62.

Referring now to FIG. 5, there is shown in schematic form a mechanism which may be employed to limit the maximum speed of an automotive vehicle using an internal combustion engine. In this figure, an accelerator or throttle pedal 80 is attached to one arm 82 of an accelerator lever 84. The other arm 86 of the lever 84 is positioned generally at an acute angle with respect to the arm 82. The lever 84 is pivotally mounted at the junction of the arms 82 and 86 by means of a pin and bearing arrangement 88 that is suitably supported on the fire wall 90 of the automotive vehicle.

A carburetor induction passage 94 is shown in FIG. 5 having a throttle plate or valve 96 pivotally mounted therein, as shown at 98. A linkage means generally designated by the numeral 100 is employed to couple the throttle plate or valve 96 with the accelerator lever 84 and, more particularly, to the end of the arm 86 of this accelerator lever.

The linkage means 100 comprises a connecting means 102, which is connected at one end as shown at 104 to the end of arm 86 of the accelerator lever 84. This connecting means 102 extends through an aperture 106 in the fire wall 90. The other end of the connecting means 102 is pivotally connected by pivotal connection 108 to one end of a first link 110. The other end of the first link 110 is pivotally connected by pivotal connection 112 to one end of a second link 114. The other end of the second link 114 is pivotally anchored, as shown at 116, to a solid abutment, for example, a portion of the internal combustion engine which employs the present invention.

The throttle plate or valve 96 has a crank arm 118 connected thereto and this crank arm is pivotally connected at one end to one end of a third link 120, as shown at 122. The other end of the link 120 is pivotally connected by pivotal connection 124, to the first link 110 at a position intermediate its ends. In addition, a tension spring 126 is employed to bias the third link 120 to the right, as shown in FIG. 5, to thereby bias the throttle plate or valve 96 to the closed position. An auxiliary tension spring 128 is connected to first link 110 intermediate the pivotal connection 124 of the link 110 to the link 120 and the pivotal connection 108 coupling the end of link 110 to the end of connecting means 102. An abutment 130 is positioned to limit the movement of the pivotal connection 112 to the right, as shown in FIG. 5, for purposes which will be described subsequently.

An electromagnet 132 is positioned in the engine compartment of the automotive vehicle and adjacent to the second link 114 of the linkage means 100. This electromagnet 132 comprises a generally U-shaped ferromagnetic yoke 134 having a body portion 136 and two arms 138 and 140 extending from either end thereof at substantially right angles. A solenoid or winding 142 is positioned around the body portion 136 of the ferromagnetic yoke 134. This solenoid or winding 142 has one end connected to ground through lead 144 and the other end thereof connected through lead 146, which may comprise or be included within an armored cable 148, to a stationary contact 150 of a relay 152. The other stationary contact 154 of the relay 152 is connected through lead 156 and lead 38 (shown in FIGS. 3 and 4) to the positive terminal 34 of the source of electrical energy or storage battery 32.

As shown here, a normally open switch, shown in schematic form, is the transistor 44, shown in FIG. 3, and this switch has one terminal, which may be emitter 46, connected to the positive terminal 34 of storage battery 32, through leads 48, 38, and 36. The other terminal of this normally open switch, which may be the collector 50 of transistor 44, is connected through the lead 54 to one terminal of the warning lamp 52, and this warning lamp, in turn, has its other terminal connected to ground through the lead 56.

The winding for the relay 152 is the winding or solenoid 62 shown in FIG. 4, and it has one end connected through lead 70 to ground which is shown here in the form of the speedometer cable housing 162 of the automotive vehicle. The other end of the winding 62 is connected to the lead 156 and, hence, the positive terminal 34 of the source of electrical energy or storage battery 32 through the normally closed switch, which is the transistor 64 shown in FIG. 4. The armature 164 of the relay 152 is adapted to contact the stationary contacts 150 and 154 when the solenoid or winding 62 is energized to thereby supply electrical energy to the winding 142 of electromagnet 132.

OPERATION

With the vehicle at the rest position and the ignition switch of the vehicle open, the tension spring 126 connected to link 120 will move this link to the right and thereby cause crank arm 118 to move the throttle plate or valve 96 to the closed position. This action will anchor the pivotal connection 124 that connects link 120 to the first link 110. Consequently, auxiliary tension spring 128 will rotate link 110 clockwise about the pivotal connection 124 and thereby move the pivotal connection 112 and the link 114 into the position shown in the solid lines in FIG. 5. In this position, the body of the link 114 is positioned closely adjacent the legs 138 and 140 of yoke 134 of the electromagnet 142.

When the ignition switch of the vehicle is closed so that transistor 64 shown in FIG. 4 is energized, the transistor 64 will be switched to a conducting state thereby energizing the solenoid or winding 62. Energization of the solenoid or winding 62 will move the armature of relay 152 into the closed position thereby energizing the winding 142 of electromagnet 132 from the source of electrical energy 32. Energization of the winding 142 creates a magnetic field through the yoke 134 to thereby maintain the second link 114 in the position shown in FIG. 5 and maintain the pivotal connection 112 between the link 110 and the link 114 in the solid line position shown in FIG. 5.

When the vehicle operator depresses the accelerator pedal 80, the arm 86 of accelerator lever 84 is moved counterclockwise and to the left as shown in FIG. 5 thereby moving the pivotal connection 108 to the left and rotating the first link 110 counterclockwise about the pivotal connection 112. This action moves the pivotal connection 124 between the link 120 and the first link 110 to the left as shown in FIG. 5 thereby opening the throttle plate or valve 96. This action is shown by the dotted line position of the accelerator lever 84 and the linkage 100. Thus, during normal vehicle operation, movement of the accelerator pedal 80 will pivot first link 110 about the pivotal connection 112 from the solid line position shown in FIG. 5 to control the opening and closing movement of the throttle plate or valve 96.

Should the speed of the automotive vehicle exceed the first predetermined speed level, for example, 80 miles per hour, as shown in FIG. 1, the straight portion 16 of hairspring 14 will engage the pin 27, thereby switching transistor 44 which is represented by the normally open switch shown in FIG. 5 to a conducting state. This energizes the warning lamp 52 and informs the vehicle operator that he has exceeded this first predetermined speed level, for example, 80 miles per hour.

Should the vehicle operator continue to increase the speed of the vehicle until the second predetermined speed level or limit is reached, for example, 90 miles per hour, as shown in FIG. 1, the straight portion or end 17 of the hairspring 15 will engage the pin 28. This grounds the base 74 of transistor 64 thereby switching transistor 64 to a nonconducting state. As a result, the solenoid or winding 62 of the relay 152 is de-energized and the armature 164 of this relay moves to the open position. This action disconnects the winding 142 of electromagnet 132 from the source of electrical energy 32, thereby reducing substantially the magnetic field in the yoke or frame 134 which previously had been employed to hold the second link 114 and the pivotal connection 112 in the solid line position shown in FIG. 5. At this time, the action of the tension springs 126 and 128 will move the pivotal connection 112 and the first link 110 to the right, as shown in FIG. 5 so that the pivotal connection 112 rotates with link 114 about the pivotal anchor 116. The pivotal connection 112 is limited in its movement to the right as shown in FIG. 5 by the abutment 130.

It can be readily appreciated that the movement of the pivotal connection 112 to the right as shown in FIG. 5 will move the pivotal connection 124 to the right as shown in FIG. 5, and into the second or right hand dotted line position. Consequently, the pivotal connection 122 is moved to the right and the throttle plate or valve 96 is moved toward the closed position, thereby reducing the speed of the automotive vehicle below the second predetermined speed level, for example, 90 miles per hour as shown in FIG. 1.

When the speed is reduced below the second predetermined speed level, the end 17 of the hairspring 15 will come out of engagement with the pin 28 thereby switching transistor 64 back to a conducting state and re-energizing solenoid or winding 62 of the relay 152. This action will move the armature 164 into its closed position thereby re-energizing the winding 142 of the electromagnet 132. The electromagnet 132 is so designed that it has insufficient magnetic force or field to move the link 114 and the pivotal connection 112 out from engagement with the abutment 130. Consequently, the vehicle operator cannot increase the speed of the vehicle further. He may only reestablish the normally operating position of the linkage 100 by releasing the pressure on the accelerator pedal 80. When he does this, the throttle plate or valve 96 is moved to the closed position and the tension spring 128 acts to rotate the first link 110 clockwise about the pivotal connection 124 between this first link 110 and the link 120. Consequently, the second link 114 and the pivotal connection 112 is rotated counterclockwise about the pivotal anchor 116 back into the solid line position shown in FIG. 5. At this time, the magnetic field of the electromagnet 132 holds the link 114 in this position and the linkage 100 is returned to its normal operating position.

As indicated in FIG. 5, the solenoid or winding 62 of the relay 152 is connected to ground through the speedometer cable between the transmission of the vehicle and the speedometer head of the vehicle. This particular circuit arrangement has been provided to help render the system tamper proof. For example, if the vehicle operator should attempt to disable this maximum speed limiter for the vehicle by disconnecting the speedometer cable from either the transmission or the speedometer head, the ground connection for the solenoid or winding 62 of the relay 152 would be lost. Consequently, the relay 152 could not be closed and the winding 142 of electromagnet 132 could not be energized. As a result, when the vehicle operator pushes or applies pressure on the accelerator pedal 80, the first link 110 is pivoted counterclockwise about the pivotal connection 124 and the pivotal connection 112 and the second link 114 will be immediately rotated clockwise as shown in FIG. 5 to a point where the pivotal connection 112 will engage abutment 130. This action will assure that the vehicle operator may not operate the vehicle above the second predetermined speed level or limit, for example, 90 miles per hour, since the linkage 100 in this position will not permit the throttle plate or valve 96 to be opened sufficiently to exceed this predetermined speed level or limit.

Similarly, the system has been designed so that if the vehicle operator attempts to tamper with the battery supply voltage to the instrument cluster of the vehicle, the speedometer switches as shown in FIGS. 3 and 4, the relay 152 and the armored cable 148, the winding or solenoid 62 will be de-energized and the relay 152 will be opened thereby cutting off a supply of electrical energy from storage battery 32 to the winding 142. As explained above, if this occurs, the first application of pressure on accelerator pedal 80 will move the linkage 100 to the dotted line position where pivotal connection 112 is in engagement with abutment 130 thereby preventing movement of the throttle plate or valve 96 to a position sufficient to permit the vehicle to exceed the second predetermined speed level. Similarly, any attempt to tamper with the armored cable 148 will break the circuit between the source of electrical energy 32 and the winding 142 of the electromagnet 132.

The present invention thus provides a reliable and accurate maximum speed limiter for an automotive vehicle. It also has the capability of alerting or warning the vehicle operator that he has exceeded a speed which is below the predetermined maximum speed level and that he is approaching this speed level.

We claim:

1. In an automotive vehicle the combination comprising a throttle pedal, a carburetor, a carburetor throttle, linkage means interconnecting the throttle pedal and the carburetor throttle, said linkage means comprising a first link and a second link, means pivotally connecting one end of said first link to one end of said second link, the other end of said first link connected to said throttle pedal, the other end of said second link being pivotally anchored, means coupled to said carburetor throttle and to said first link at a position intermediate the ends thereof, and means operatively controlling said second link such that when the speed of the automotive vehicle is below a predetermined limit, said means pivotally connecting is maintained in one position in which movement of said throttle is controlled by movement of said first link about said one position and, when the speed of the vehicle exceeds said predetermined limit, said means pivotally connecting is moved in a direction moving said throttle toward the closed position.

2. The combination of claim 1 in which said means operatively controlling comprises an electromagnet and switch means coupled to said electromagnet for energizing said electromagnet when the speed of the vehicle is below said predetermined speed limit and for de-energizing said electromagnet when the speed of the vehicle exceeds said predetermined limit.

3. The combination of claim 2 in which said switch means includes a relay having a winding and an armature, said armature being positioned to energize said electromagnet when said winding is energized and to de-energize said electromagnet when said winding is de-energized, and means responsive to the vehicle reaching said predetermined speed limit for de-energizing said winding.

4. The combination of claim 3 in which said last mentioned means comprises a normally conducting solid state switching means having an output circuit coupled to energize said winding and a control electrode, and means coupled to said control electrode for switching said solid state switching means to a non-conducting state when the speed of the vehicle exceeds the predetermined speed limit.

5. In an automobile vehicle, the combination comprising a throttle pedal, a carburetor, a carburetor throttle, linkage means interconnecting the throttle pedal and the carburetor throttle, said linkage means comprising a link having one end connected to said throttle pedal, a moveable pivotal connection pivotally mounting the other end of said link and means coupled intermediate the ends of said link and said carburetor throttle for controlling the movement of said carburetor throttle in accordance with the movement of said accelerator pedal, and means operatively coupled to said linkage means for maintaining said moveable pivotal connection in one position when the speed of the vehicle is below a predetermined speed level and for moving said moveable pivotal connection to a second position and in a direction to move said carburetor throttle valve toward a closed position when the speed of the automotive vehicle is equal to or above said predetermined speed limit.

6. The combination of claim 5 in which said means operatively coupled to said linkage means comprise an electromagnet and means coupled to said electromagnet for energizing said electromagnet when the speed of the vehicle is below said predetermined speed level and for de-energizing said electromagnet when the speed of the vehicle is equal to or above said predetermined speed level.

7. The combination of claim 5 in which said means operatively coupled to said linkage means comprises electromagnetic means acting on said linkage means, a source of electrical energy and means for energizing said electromagnetic means from said source of electrical energy when the speed of the vehicle is below said predetermined speed level and for de-energizing said electromagnetic means when the speed of the vehicle is equal to or exceeds said predetermined speed level.

8. The combination of claim 6 and further comprising means coupled to said linkage means for moving said pivotal connection to said second position upon movement of said throttle pedal to open said carburetor throttle valve at any time said electromagnetic means is de-energized.

9. The combination of claim 5 and further comprising a second link pivotally anchored at one end, the other end thereof being pivotally connected to said other end of said first mentioned link, said means operatively coupled to said linkage means includes means operatively coupled to said second link.

10. The combination of claim 9 in which means operatively coupled to said second link comprises an electromagnetic means and means for energizing said electromagnetic means when the speed of the vehicle is below said predetermined speed level and for de-energizing said electromagnetic means when the speed of the vehicle is equal to or above said predetermined speed level.

* * * * *